United States Patent
Campbell et al.

(10) Patent No.: US 6,851,504 B2
(45) Date of Patent: Feb. 8, 2005

(54) METHOD AND APPARATUS FOR ANTICIPATING A VEHICLE CRASH EVENT

(75) Inventors: Douglas P. Campbell, Metamora, MI (US); Gregory S. Bayley, Dryden, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 70 days.

(21) Appl. No.: 10/193,766

(22) Filed: Jul. 10, 2002

(65) Prior Publication Data

US 2002/0185324 A1 Dec. 12, 2002

Related U.S. Application Data

(63) Continuation-in-part of application No. 09/952,111, filed on Sep. 14, 2001, which is a continuation of application No. 09/211,702, filed on Dec. 14, 1998, now abandoned.

(51) Int. Cl.$^7$ ................................................ B60D 1/28
(52) U.S. Cl. .................... 180/271; 280/735; 701/45; 340/435; 340/903
(58) Field of Search ........................ 180/271, 282, 180/167; 280/735; 340/436, 435, 901, 903; 701/45, 301

(56) References Cited

U.S. PATENT DOCUMENTS

| | | |
|---|---|---|
| 3,687,213 A | 8/1972 | Sato et al. |
| 3,789,950 A | 2/1974 | Strenglein |
| 4,931,793 A | 6/1990 | Fuhrmann et al. |
| 5,208,756 A | 5/1993 | Song |
| 5,285,188 A | 2/1994 | Yoshida |
| 5,502,432 A | 3/1996 | Ohmamyuda et al. |
| 5,572,449 A | 11/1996 | Tang et al. |
| 5,581,232 A | 12/1996 | Tanaka et al. |
| 5,646,613 A | 7/1997 | Cho |
| 5,670,953 A | 9/1997 | Satoh et al. |
| 5,680,117 A | 10/1997 | Arai et al. |
| 5,684,473 A | 11/1997 | Hibino et al. |
| 5,684,474 A | 11/1997 | Gilon et al. |
| 5,739,768 A | 4/1998 | Lane et al. |
| 5,748,477 A | 5/1998 | Katoh |
| 5,757,284 A | 5/1998 | Trizzino et al. |
| 5,959,552 A | 9/1999 | Cho |
| 6,031,484 A | 2/2000 | Bullinger et al. |
| 6,085,151 A | 7/2000 | Farmer et al. |
| 6,268,804 B1 * | 7/2001 | Janky et al. ............ 340/903 |
| 6,314,366 B1 | 11/2001 | Farmakis et al. |

FOREIGN PATENT DOCUMENTS

DE 197 41 631 3/1999

* cited by examiner

*Primary Examiner*—Ruth Ilan
(74) *Attorney, Agent, or Firm*—Tarolli, Sundheim, Covell & Tummino L.L.P.

(57) ABSTRACT

An apparatus (10) for anticipating a crash event between a vehicle (12) and an object (16) comprises a source (34) of position information located remote from the vehicle (12) and operable for providing a vehicle position signal (30) indicating vehicle position. A vehicle speed sensor (90) is operable for sensing vehicle speed and for providing a vehicle speed signal indicating vehicle speed. A source (74) of object condition information is located remote from the vehicle (12) and is operable for providing an object path signal (38) indicating position and speed of the object (14). A controller (22) is mounted on the vehicle (12) and is operable, in response to receiving the vehicle position signal and the vehicle speed signal (30), for determining a vehicle path. The controller (22) is also operable, in response to receiving the object path signal (38), for anticipating the crash event.

35 Claims, 9 Drawing Sheets

METHOD AND APPARATUS FOR ANTICIPATING A VEHICLE CRASH EVENT

RELATED APPLICATIONS

This application is a continuation-in-part of U.S. patent application Ser. No. 09/952,111, filed Sep. 14, 2001, now abandoned, which is a continuation of U.S. patent application Ser. No. 09/211,702, filed Dec. 14, 1998, now abandoned.

TECHNICAL FIELD

The present invention relates to a method and apparatus for anticipating a crash event between a vehicle and an object.

BACKGROUND OF THE INVENTION

It is known to actuate vehicle occupant protection devices in response to a vehicle crash event. Typically, one or more crash event sensors are attached to the vehicle for detecting the occurrence of the vehicle crash event. For example, the crash event sensor may be an inertia sensing device, a crush sensing device, and/or an acceleration sensing device. When the crash event sensor or sensors detect the occurrence of a crash event, one or more occupant protection devices are actuated to help protect one or more vehicle occupants.

Another type of occupant protection system transmits signals that are reflected off an adjacent object. The distance between the vehicle and adjacent object is determined by a time interval for the signal to return. For example, the system may use electromagnetic waves or ultrasonic waves to measure the distance between the vehicle and an adjacent object. The system attempts to prevent the occurrence of a vehicle crash event by activating a warning signal to alert a vehicle occupant when the measured distance indicates an increased risk of a vehicle crash event.

SUMMARY OF THE INVENTION

The present invention relates to an apparatus for anticipating a crash event between a vehicle and an object. The apparatus comprises a source of position information that is located remote from the vehicle and is operable for providing a vehicle position signal indicating vehicle position. A vehicle speed sensor is operable for sensing vehicle speed and for providing a vehicle speed signal indicating the vehicle speed. A source of object condition information located remote from the vehicle and operable for providing an object path signal indicating position and speed of the object. A controller is mounted on the vehicle and is operable, in response to receiving the vehicle position signal and the vehicle speed signal, for determining a vehicle path. The controller is also operable, in response to receiving the object path signal, for anticipating a crash event between the vehicle and the object.

In accordance with another aspect, the present invention relates to a method for anticipating a crash event between a vehicle and an object. During the method, a vehicle position signal indicating vehicle position is received at the vehicle. The vehicle position signal originates at a source of position information located remote from the vehicle. A vehicle speed signal indicating vehicle speed is received at the vehicle. A vehicle path is determined, in response to the vehicle position signal and the vehicle speed signal. An object path signal indicating position and speed of the object is received. The object path signal originates at the object. A crash event between the vehicle and the object is anticipated, in response to the object path signal and determined vehicle path.

BRIEF DESCRIPTION OF THE DRAWINGS

The foregoing and other features of the present invention will become more apparent to one skilled in the art upon consideration of the following description of preferred embodiments of the present invention and the accompanying drawings in which.

DESCRIPTION OF A PREFERRED EMBODIMENT

Figure 1:
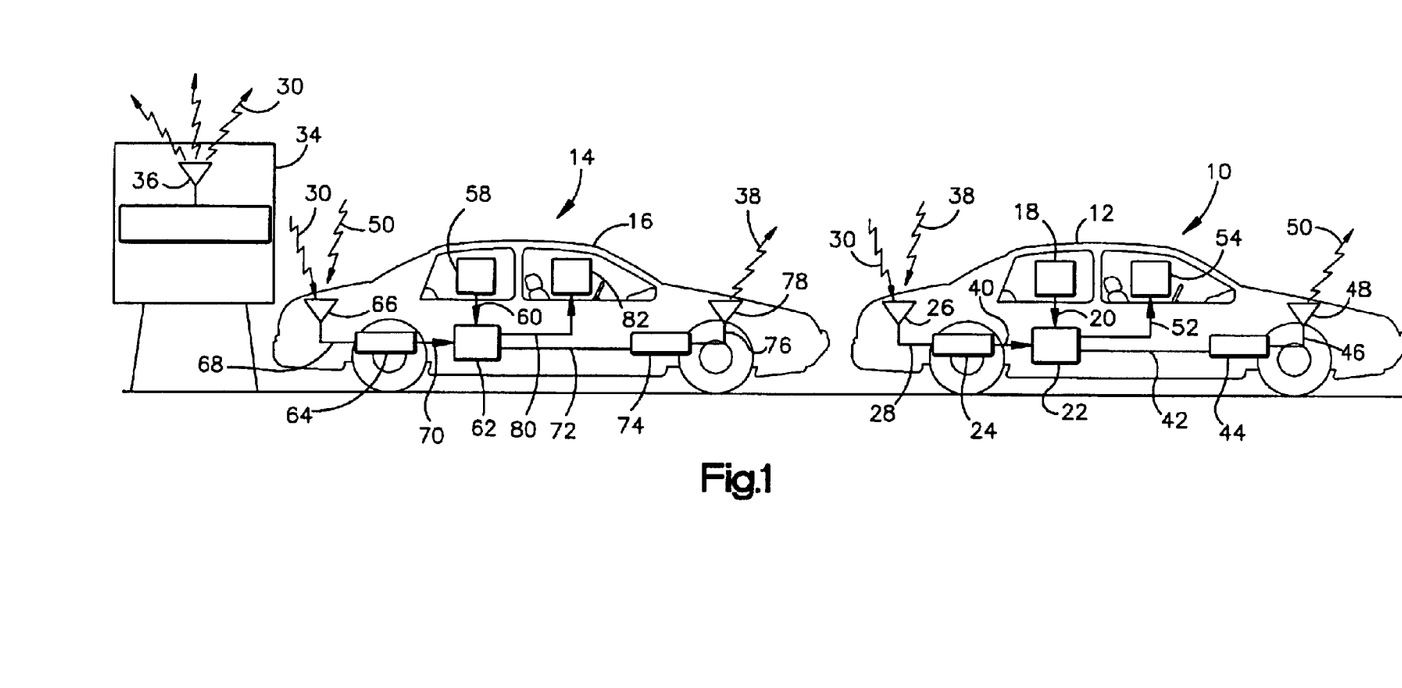
FIG. 1 is a schematic representation of an apparatus constructed in accordance with the present invention.

FIG. 1 schematically illustrates an occupant protection system 10 installed in a first vehicle 12. Another occupant protection system 14 is installed in an adjacent object, such as a second vehicle 16. It will be understood and appreciated that, alternatively, the second system 14 might be part of another type of moveable object or a stationary object, such as a highway abutment, a sign, or other high mass object which might be located adjacent a roadway.

The systems 10 and 14 communicate with each other so that the occurrence of a vehicle crash event between the first and second vehicles 12 and 16 may be anticipated. By anticipating a vehicle crash event, actuation of various occupant protection devices, such as inflatable air bags and actuatable seat belt devices, may be controlled.

The system 10 of the first vehicle 12 includes vehicle condition circuitry 18. The vehicle condition circuitry 18 provides at least one signal 20 indicative of at least one predetermined vehicle condition to a microcontroller 22. The vehicle condition sensing circuitry 18 may include, for example, a vehicle speed sensor and a conventional crash event sensor, such as an accelerometer or an inertia sensing device, a crush sensor or an impact sensing device.

It will be understood that the microcontroller 22 preferably includes a microprocessor programmed to determine the occurrence of a vehicle crash event as well as to control one or more occupant protection devices. The microcontroller 22 may be in any form, such as, for example, one or more integrated circuits, a plurality of discrete components, or a combination of appropriately configured integrated circuits and discrete components.

The system 10 also includes a receiver 24 connected with an antenna 26 through a suitable electrical connection 28.

The combination of the antenna 26 and receiver 24 receives signals 30 and 38. Preferably, the signals 30 and 38 are radio frequency (RF) signals of a predetermined frequency. The signals 30 and 38 could be transmitted over free space in any form capable of containing useful information, such as in the form of electromagnetic waves, sound waves, etc. The particular signal form or frequency is a matter of design choice. In addition, the signals 30 and 38 may be the same or different types of signals.

One signal 30 is transmitted, suitably as a periodic broadcast, from a source 34 of location or position information. The source 34 of position information includes an appropriate antenna 36 from which the position signal 30 radiates. While in the preferred embodiment of FIG. 1, the source 34 of the position information signal 30 is shown as a terrestrial beacon, it will be understood and appreciated that a satellite-based system, such as a conventional Global Positioning System (GPS), also could be used. It further will be appreciated that a vehicle location system using a cellular telephone network, such as disclosed in U.S. Pat. No. 5,208,756, also could be used. Because these and other position sensing systems may be used in accordance with the present invention, the position information simply is described as being contained within the position signal 30. The position of the vehicle 12 is determined from the position signal 30, suitably by the microcontroller 22.

The receiver 24 also receives an object signal 38 that contains information indicative of a condition of another object, such as vehicle condition information of the adjacent vehicle 16. As described below, the vehicle condition information of the signal 38 is sufficient for the system 10 to determine the instantaneous position, speed and/or path of travel for the vehicle 16. When an object, such as the vehicle 16, is stationary, the speed value for the object is zero and thus its path corresponds to a point having a constant position.

The receiver 24 includes suitable circuitry for filtering, amplifying and modulating the received signals 30 and 38 for use by the microcontroller 22. The receiver 24 provides to the microcontroller 22 at least one processed signal 40 which corresponds to both of the received signals 30 and 38.

The microcontroller 22 provides a signal 42 to a transmitter 44. Signal 42 contains information indicative of the vehicle condition of the first vehicle 12. The vehicle condition signal 42, for example, contains information identifying an instantaneous vehicle speed of the vehicle 12 as well as information identifying an instantaneous position of the vehicle 12, such as determined from the position signal 30. The condition signal 42 also might indicate a path of travel for the vehicle 12 based on a plurality of previous position data and the most recent position information received from the source 34. The position information may be stored in suitable memory associated with the microcontroller 22.

The transmitter 44 contains circuitry to modulate the vehicle condition signal 42 and to provide the modulated signal 46 to an antenna 48. The antenna 48, in turn, broadcasts a vehicle condition signal 50 which may be received by one or more occupant protection systems, such as the system 14 of the vehicle 16 located adjacent to the vehicle 12. Preferably, the vehicle condition information of the signal 50 is updated at a sufficient rate so as to provide substantially instantaneous vehicle condition information to the system 14 of the adjacent vehicle 16.

The microcontroller 22 also is configured to determine whether an anticipatory crash event condition exists. In general, an anticipatory crash event condition exists where, based upon a comparison of the current relative position and speed of the vehicle 12 and the current relative position and speed of the vehicle 16, the probability of a vehicle crash event between the vehicles 12 and 14 is greater than some threshold value. That is, a vehicle crash event is imminent.

The microcontroller 22 also is effective to control actuation of at least one actuatable occupant protection device 54. Upon determining the existence of a vehicle crash event condition, the microcontroller 22 provides a control signal 52 to the protection device 54. This causes actuation of the protection device 54 to help cushion and/or restrain a vehicle occupant during a vehicle crash event. Examples of suitable occupant protection devices 54 are described below.

The occupant protection system 14 of the second vehicle 16 is substantially identical to the system 10 of the first vehicle 12. The system 14 includes vehicle condition circuitry 58 that provides a signal 60 indicative of at least one predetermined vehicle condition to a microcontroller 62. The vehicle condition sensing circuitry 58 preferably includes at least a vehicle speed sensor and a crash event sensor, both of which are known in the art.

The system 14 also includes a receiver 64 connected with an antenna 66 through a suitable electrical connection 68. The antenna 66 receives signals 30 and 50, as described above. The signal 30 is transmitted from the source 34 of position information. The system 14 determines the position of the vehicle 16 upon receiving the signal 30. The receiver 64 also receives the condition signal 50, which contains position and speed information for at least one adjacent object, such as the vehicle 12.

The receiver 64 is substantially identical to the receiver 24 of the previously described system 10. The received signals 30 and 50 are appropriately filtered, amplified, and demodulated. The receiver 64 provides to the microcontroller 62 a signal 70 corresponding to the received signals 30 and 50. The microcontroller 62 is configured to determine whether an anticipatory crash event condition exists.

The microcontroller 62 also provides a signal 72 to a transmitter 74. Signal 72 contains information indicative of the vehicle condition of the second vehicle 16. The vehicle condition signal 72 preferably contains information identifying at least an instantaneous vehicle speed of the vehicle 16 as well as information indicative of an instantaneous position of the vehicle. The vehicle condition signal 72 also might contain information indicating the path of the vehicle 16 as determined by the microcontroller 22 based upon current and previous vehicle condition information. The transmitter 74 modulates the vehicle condition signal 72 to an appropriate frequency signal 76 and supplies the modulated signal 76 to an antenna 78 for broadcasting of the vehicle condition signal 38. The signal 38 may be received by other occupant protection systems, such as the system 10 of the vehicle 12.

The microcontroller 62 also is effective to provide a control signal 80 to one or more occupant protection devices 82. This helps to cushion and/or restrain a vehicle occupant upon determining the existence of a vehicle crash event condition.

It will be appreciated by those skilled in the art that each occupant protection system 10 and 14 communicates vehicle condition information, preferably including vehicle speed and relative vehicle position. The vehicle condition information signals 38 and 50 may be received by another system located within range of the respective system transmitters 44 and 74. It further will be appreciated that instead of each system having a separate transmitter and receiver, a system in accordance with the present invention may utilize a transceiver capable of both transmitting and receiving the appropriate data signals.

Figure 2:
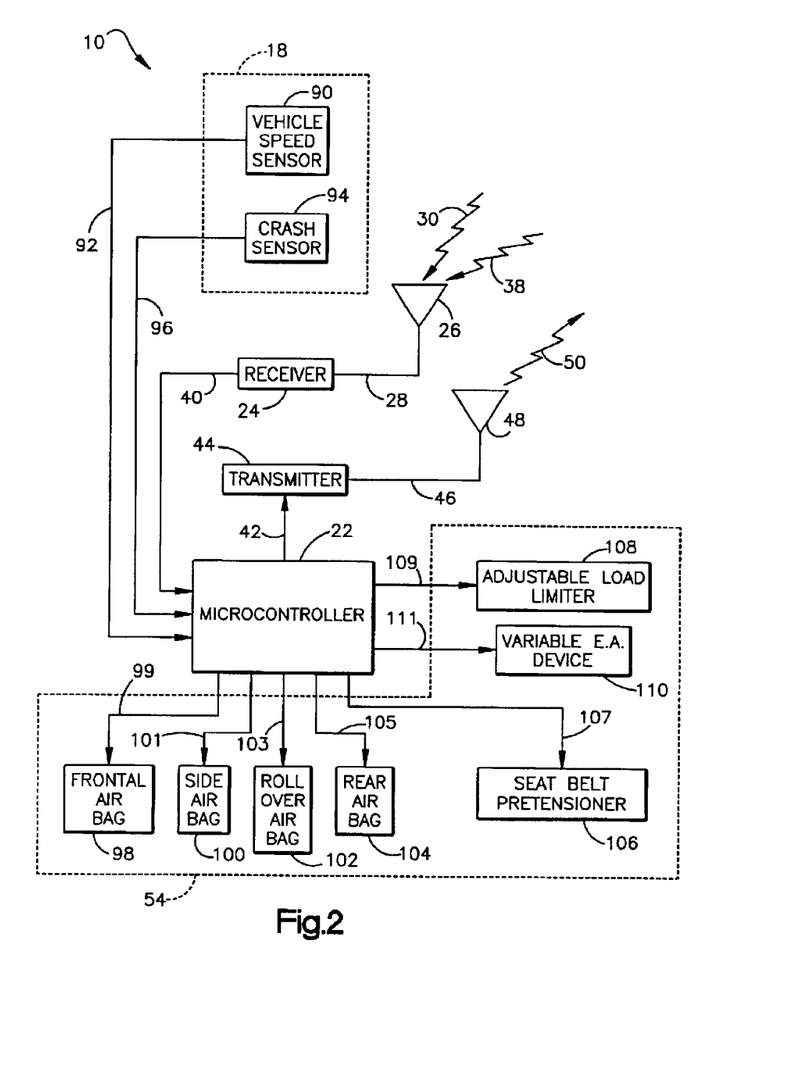
FIG. 2 is a schematic representation of part of FIG. 1.

FIG. 2 illustrates the system 10 of FIG. 1 in accordance with a preferred embodiment of the present invention. In this embodiment, the vehicle condition circuit 18 includes a vehicle speed sensor 90 that provides to the microcontroller 22 a vehicle speed signal 92 having an electrical characteristic indicative of vehicle speed. The vehicle speed sensor 90 may be part of a conventional speedometer of the vehicle 12. Alternatively, the vehicle speed sensor 90 may be a separate electronic component operative to monitor the rotation of a vehicle wheel and thereby provide a signal indicative of the vehicle's speed. The informational content of the signal 92 may be processed by the sensor 90 to provide a value indicative of the vehicle speed. Alternatively, the signal 92 may simply contain a value that is processed by the microcontroller 22 for a determination of the instantaneous vehicle speed.

The vehicle condition circuit 18 also includes a crash event sensor 94, which is effective to provide to the microcontroller 22 a signal 96 having an electrical characteristic indicative of the occurrence of a vehicle crash event. Preferably, the crash sensor 94 includes at least one acceleration sensing device, such as an accelerometer. Alternatively or in addition to an acceleration sensing device, the crash sensor 94 may include an inertia sensing device, a crush sensor, and/or a vehicle rollover sensor.

The microcontroller 22 is configured to determine the occurrence of a vehicle crash event in response to the crash sensor signal 96. Any known control algorithm, suitably selected according to the type(s) of crash sensor(s) and vehicle platform, may be used to determine the occurrence of a vehicle crash event.

The microcontroller 22 also is operative to determine the occurrence of an anticipatory vehicle crash event. In particular, the microcontroller 22 determines a first vehicle path for the vehicle 12 in which the system 10 is installed. The first vehicle path is determined upon the microcontroller 22 receiving the position signal 30 from the source 34 of position information and the vehicle speed signal 92 from the vehicle speed sensor 90. Preferably, the microcontroller 22 stores the path information and/or previous vehicle speed and position information in appropriate memory.

Preferably, the first vehicle path is determined based upon previous vehicle position information and speed information for the vehicle 12 as well as the most recent instantaneous speed and position information. The microcontroller 22 suitably extrapolates from the previous and instantaneous data to determine an anticipated path or trajectory for the vehicle 12.

The microcontroller 22 also is operative to determine an anticipated path for an object located adjacent to the vehicle 12, such as the second vehicle 16. In FIG. 1, the second path is determined upon receiving the vehicle condition signal 38 from the vehicle 16. Specifically, the receiver 24 receives the broadcast vehicle condition signal 38 from the second vehicle 16 and provides the corresponding receiver signal 40 to the microcontroller 22. It will be understood and appreciated that the internal relative position information of the vehicle 12 and the vehicle condition information of adjacent vehicle 16 may be provided to the microcontroller 22 by more than one line from the receiver 24.

The vehicle condition information of the second vehicle 16 preferably contains the same types of data used to calculate the first vehicle path, namely position information and speed information for the second vehicle. Alternatively, the microcontroller 62 of the second vehicle 16 might calculate and transmit the vehicle condition signal 38 indicating its own path. The microcontroller 22 determines an anticipated vehicle path for the second vehicle 16, which may be extrapolated from the instantaneous and previous vehicle condition data of the second vehicle. The microcontroller 22 compares the anticipated vehicle path of the first vehicle 12 with the anticipated vehicle path of the second vehicle 16 to determine whether an anticipatory crash event condition exists.

The microcontroller 22 also is operative to control at least one and preferably a plurality of actuatable occupant protection devices 54 to help cushion and/or restrain a vehicle occupant upon determining the existence of a vehicle crash event. The protection devices 54 are actuatable upon determining the occurrence of an impact-responsive vehicle crash event, suitably based upon the crash sensor signal 96. The protection devices 54 also are actuatable upon determining the existence of an anticipatory crash event condition.

The protection devices 54 include one or more inflatable occupant protection devices and/or a variety of seat belt restraining mechanisms to help protect a vehicle occupant during a vehicle crash event. The occupant protection devices 54 may include, for example, a front air bag 98, a side air bag 100, a rollover air bag 102, a rear air bag 104, a seat belt pretensioner device 106, an adjustable load limiter 108, a variable energy absorbing device 110 or any other suitable occupant protection device.

Depending upon the anticipated severity and direction of the anticipated crash event, the microcontroller 22 controls actuation of one or any number of the protection devices 98, 100, 102, 104, 106, 108 and 110 through respective control signals 99, 101, 103, 105, 107, 109, and 111. Such control signals 99, 101, 103, and 105 may indicate, for example, the amount of inflation and/or time of actuation for the inflatable occupant protection devices 98, 100, 102 and 104. Similarly, the control signals 107, 109, and 111 might control the timing and/or amount of restraining force provided by the seat belt restraint mechanisms 106, 108 and 110.

Figure 3:
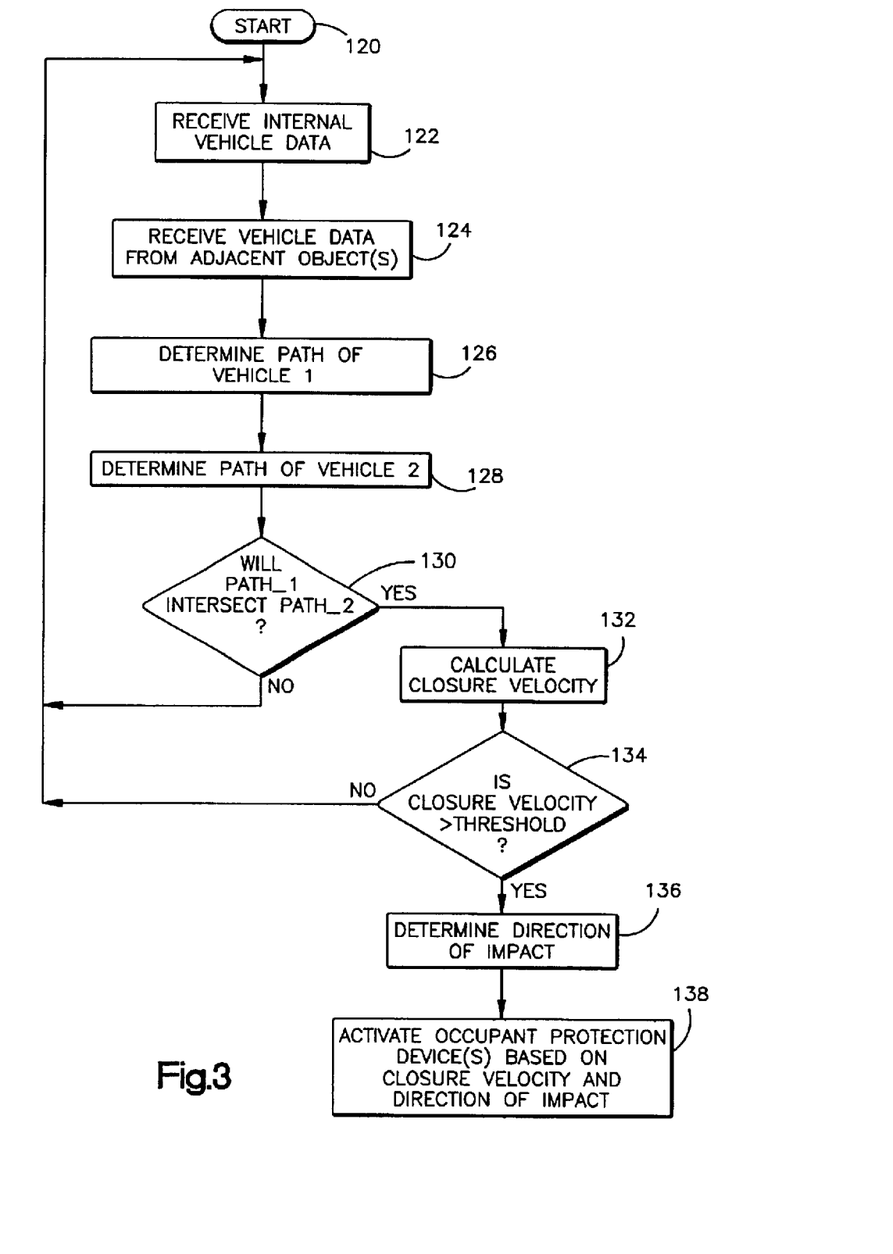
FIG. 3 is a flow diagram illustrating a control process in accordance with a preferred embodiment of the present invention.

FIG. 3 illustrates a preferred manner of operation for the system 10 of FIG. 2. The system 10 begins operating at step 120 upon, for example, turning on a vehicle ignition switch of the vehicle 12. The microcontroller 22 and other system components are initialized and internal memories, flags, initial conditions, etc., are set to initial values. Once activated, the microcontroller 22 is effective to receive internal vehicle condition data (step 122) indicative of the speed of the vehicle 12 and the position of the vehicle. As stated above, the internal vehicle speed sensor 90 provides the speed signal 92 to the microcontroller 22 and the receiver 24 provides the receiver signal 40 to the microcontroller, which signal includes instantaneous relative position data.

The microcontroller 22 also receives condition data from one or more adjacent objects (step 124), such as the vehicle condition data of the signal 38 from the vehicle 16 (FIG. 1). In the preferred embodiment of FIGS. 1 and 2, the signal 38 is received at the antenna 26. The receiver 24 demodulates the received signal and provides the vehicle condition data to the microcontroller 22 as part of the receiver signal 40.

Upon receiving the internal vehicle condition data (step 122), the microcontroller 22 determines the path of the first vehicle 12 (step 126). Preferably, the path of the first vehicle 12 is a function of the vehicle's speed and its relative position. Similarly, the microcontroller 22 determines the path of one or more adjacent objects (step 128), such as the vehicle 16. The path of the adjacent vehicle is determined as a function of the vehicle condition data, which preferably includes the vehicle speed and the relative position of each such adjacent object or vehicle, such as described above.

It will be appreciated by those skilled in the art that the particular order in which the vehicle paths are determined may be different from that just described. For example, the microcontroller 22 may determine the path of the first vehicle prior to receiving the vehicle data of the adjacent vehicle or vehicles. It also will be appreciated that, in certain circumstances, no vehicle data will be received from an adjacent vehicle. In this situation, the microcontroller 22 will not determine the path for any adjacent object. The adjacent object also may have a zero speed value indicative of a stationary object which has a path defined by a point. Furthermore, as the paths of the first vehicle 12 and an adjacent vehicle diverge, the adjacent vehicle eventually will be out of range and, thus, the system 10 may not be able to receive the condition signals from the diverging vehicle.

Assuming that the second vehicle 16 is within range of the first vehicle 12, the process proceeds and the microcontroller 22 determines whether the first path will intersect with the second path (step 130). If the paths do not intersect, the process returns to step 122 where the vehicle condition data is updated. The path data of the respective vehicles 12 and 16 also is updated according to new vehicle condition data.

If the microcontroller 22 determines that the first path of the first vehicle 12 will intersect the second path of an adjacent object, the microcontroller 22 calculates a relative closure velocity (step 132). In general, the closure velocity is the rate at which the relative distance between the first vehicle 12 and each adjacent object decreases, e.g. a sum of the instantaneous velocity of the vehicle 12 and instantaneous velocity of the adjacent object. Preferably, this is based upon a comparison of the vehicle condition data for the first vehicle 12 and the condition data for the adjacent object, such as the vehicle 16.

It will be understood and appreciated by those skilled in the art that the system 10 is configured to be responsive to more than one adjacent object. For example, if more than one object, including vehicles, is adjacent to the first vehicle 12 and a determination is made that the path of the first vehicle will intersect with each such object, the microcontroller 22 will proceed to determine a closure velocity for each such potentially intersecting adjacent object.

The microcontroller 22 next determines whether the closure velocity exceeds a predetermined threshold velocity (step 134). A suitable threshold velocity may be determined experimentally for a particular vehicle in which the system will be installed to provide for a desired level crash discrimination.

While FIG. 3 illustrates a single closure velocity threshold, it will be understood and appreciated by those skilled in the art that a plurality of such closure velocity thresholds may be used to provide for and facilitate variable control of the actuatable occupant protection devices 98, 100, 102, 104, 106, 108, and 110 of FIG. 2.

If the closure velocity does not exceed the predetermined threshold, the process returns to step 122 to update the vehicle condition data and recalculate the vehicle paths.

Provided that the closure velocity exceeds the threshold value, the microcontroller 22 then determines a relative direction for the anticipated impact (step 136) between the first vehicle 12 and the adjacent object. For the example of FIG. 1, the relative direction of anticipated impact is determined based upon the respective paths of the vehicles 12 and 16. The relative direction of impact indicates from which direction and at what angle the adjacent object will strike the first vehicle 12. The microcontroller 22 thus may determine which part of the vehicle body will collide with the adjacent object.

Depending upon the calculated relative direction of impact, the microcontroller 22 then proceeds to actuate one or more of the actuatable occupant protection devices 98, 100, 102, 104, 106, 108, and 110 (step 138) selectively. Preferably, the selection of the protection devices 98, 100, 102, 104, 106, 108, and 110 will be based upon the closure velocity and the relative direction of impact determined by the microcontroller 22. The actuation of the protection devices 98, 100, 102, 104, 106, 108, and 110 also may be controlled so as to provide variable amounts of cushioning or restraint, based upon the closure velocity and/or relative direction of impact parameters.

For example, upon determining an anticipatory crash event between the first vehicle 12 and an adjacent object in a head-on collision, the microcontroller 22 may control actuation of the seat belt pretensioner 106, the variable energy absorbing device 110, and/or the frontal air bag 98 to restrain and cushion an occupant or occupants of the first vehicle. Similarly, where the relative direction of impact is determined to be transverse to the first vehicle 12, such as during a side impact vehicle crash event, the microcontroller 22 may control activation of the side air bag 100 and the seat belt pretensioner device 106 to help protect one or more vehicle occupants of the first vehicle. In addition, the microcontroller 22 may vary the amount of inflation and/or restraint provided by the occupant protection devices 98, 100, 102, 104, 106, 108, and 110 depending upon the anticipated crash event parameters, e.g. closure velocity and relative direction of anticipatory impact.

Figure 4:
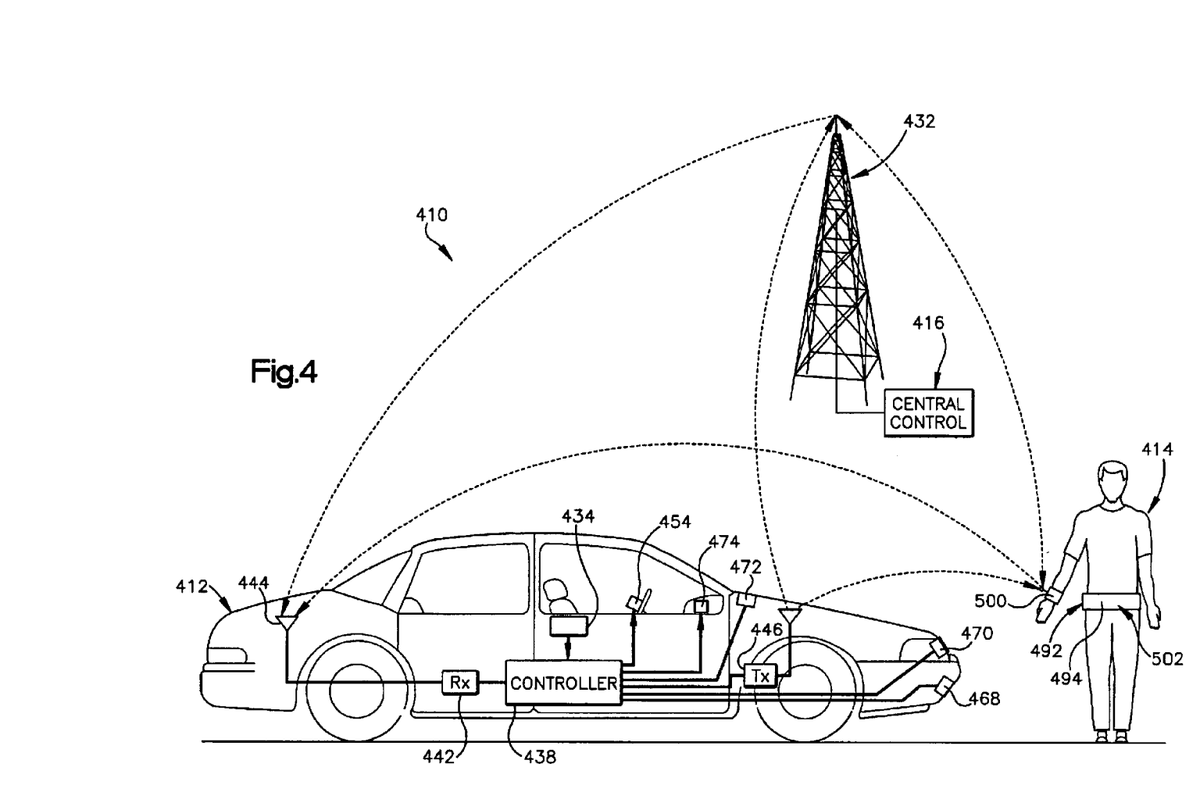
FIG. 4 is a schematic representation of an apparatus constructed in accordance with a second embodiment of the present invention.

FIG. 4 schematically illustrates an apparatus 410 constructed in accordance with a second embodiment of the present invention. The apparatus 410 illustrated in FIG. 4 is an anticipatory crash event system for anticipating a crash event between a vehicle 412 and an object 414.

Figure 5:
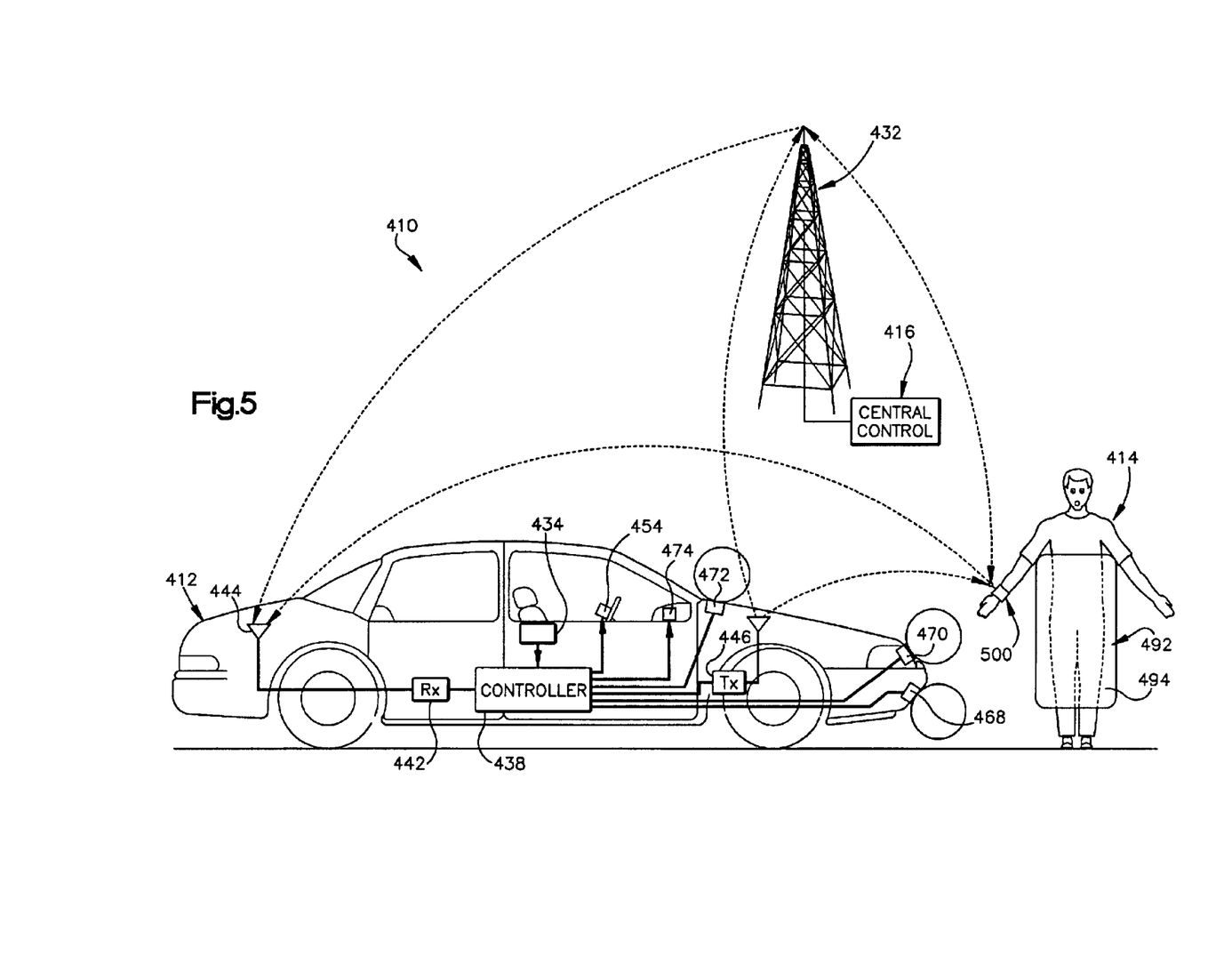
FIG. 5 illustrates the apparatus of FIG. 4 with inflatable devices in an inflated condition.
Figure 10:
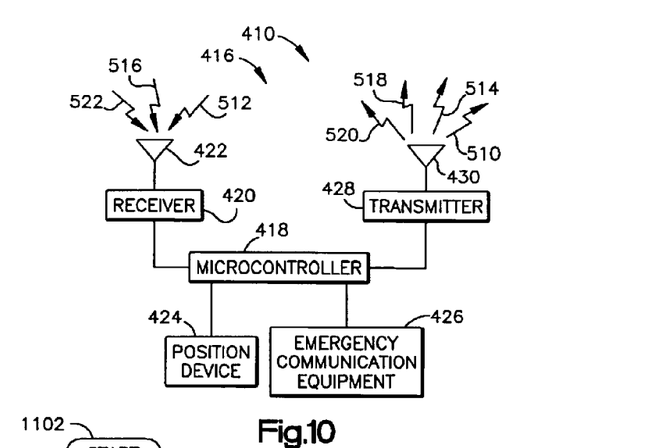
FIG. 10 is a schematic representation of a central control station portion of FIG. 4.

As shown in FIGS. 4 and 5, the anticipatory crash event system 410 includes a central control station 416. FIG. 10 schematically illustrates the central control station 416. The central control station 416 includes a microcontroller 418. The microcontroller 418 preferably includes a microprocessor. The microcontroller 418 may be in any form, such as, for example, one or more integrated circuits, a plurality of discrete components, or a combination of appropriately configured integrated circuits and discrete components.

The central control station 416 also includes a receiver 420 that is operatively connected to the microcontroller 418. The receiver 420 is also operatively connected to an antenna 422 for receiving signals that originate from locations remote from the central control station 416. Preferably, the received signals are radio frequency (RF) signals of a predetermined frequency. The receiver 420 includes suitable circuitry for filtering, amplifying, and demodulating the received signals. The receiver 420 provides the received signals to the microcontroller 418.

The central control station 416 also includes a position device 424, which is a source of location or position information. The position device 424 is operatively connected to the microprocessor 418. Emergency communication equipment is also operatively connected to the microprocessor 418 for communicating with local authorities, such as police and emergency medical services.

A transmitter 428 is also operatively connected to the microcontroller 418. The transmitter 428 receives information from the microcontroller 418. The transmitter 428 contains circuitry to modulate the information. An antenna 430 is operatively connected to the transmitter 428. The antenna 430 receives the modulated information from the transmitter 428 and, in turn, broadcasts signals. For example, the microcontroller 418 receives position information from the position device 424 and provides position information to the transmitter 428. The transmitter 428 modulates the position information and the antenna 430 broadcasts position signals. The position signals indicate the relative position of the item receiving the signal. Thus, position signal 514 indicates the position of the vehicle 412 and position signal 510 indicates the position of the object 414. FIGS. 4 and 5 show antennas 422 and 430 combined into a single antenna 432.

Figure 6:
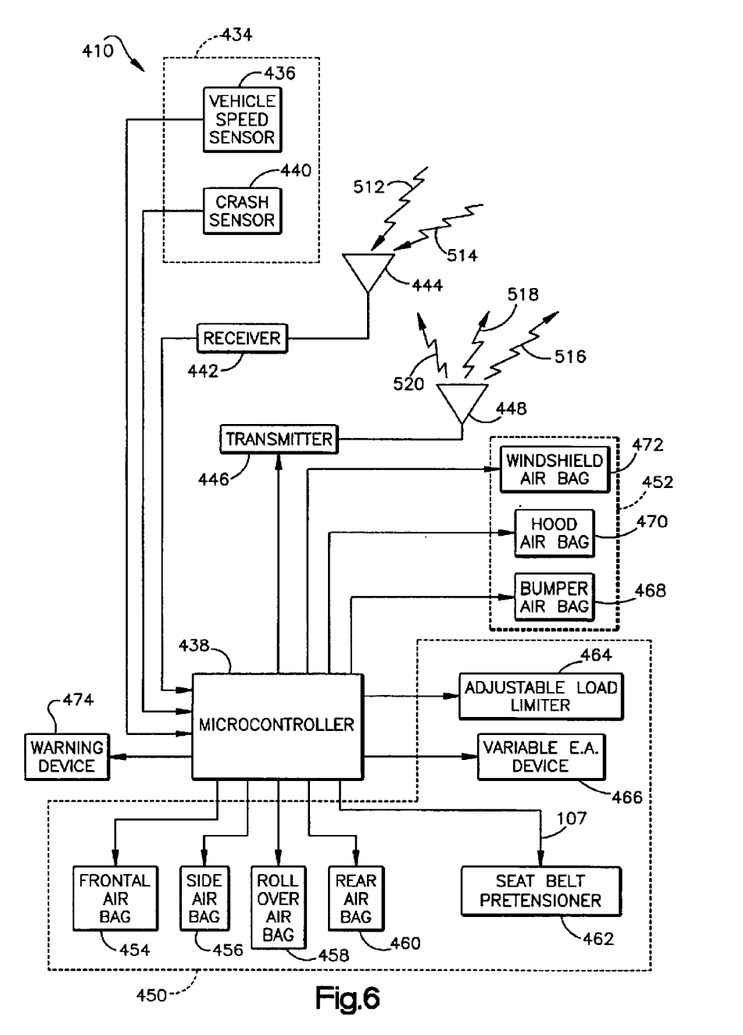
FIG. 6 is a schematic representation of a vehicle mounted portion of FIG. 4.

FIG. 6 illustrates a vehicle mounted portion of the anticipatory crash event system 410. FIGS. 4 and 5 illustrate the vehicle mounted portion mounted on the vehicle 412. The vehicle mounted portion includes vehicle condition circuitry 434. The vehicle condition circuitry 434 includes a vehicle speed sensor 436 that provides vehicle speed information to a microcontroller 438. The vehicle condition circuitry 434 may also include a conventional crash event sensor 440, such as an accelerometer or inertia sensing device, a crush sensor or an impact sensing device.

The microcontroller 438 preferably includes a microprocessor programmed to anticipate a vehicle crash event. The microcontroller 438 may be in any form, such as, for example, one or more integrated circuits, a plurality of discrete components, or a combination of appropriately configured integrated circuits and discrete components.

The vehicle mounted portion also includes a receiver 442 that is operatively connected to the microcontroller 438. The receiver 442 is also operatively connected to an antenna 444 for receiving signals that originate from locations remote from the vehicle 412. Preferably, the received signals are radio frequency (RF) signals of a predetermined frequency. The receiver 442 includes suitable circuitry for filtering, amplifying, and demodulating the received signals. The receiver 442 provides the received signals to the microcontroller 438.

The vehicle mounted portion also includes a transmitter 446. The transmitter 446 is operatively connected to the microcontroller 438 and receives information from the microcontroller. The transmitter 446 contains circuitry to modulate the received information. An antenna 448 is operatively connected to the transmitter 446. The antenna 448 receives the modulated information from the transmitter 446 and, in turn, broadcasts signals.

A plurality of protection devices is also operatively connected to the microcontroller 438 of the vehicle 412. The protection devices include vehicle occupant protection devices 450, which are generally located within a passenger compartment of the vehicle 412, and object protection devices 452, which are located on or adjacent to an exterior surface of the vehicle 412. The microcontroller 438 controls actuation of both the vehicle occupant protection devices 450 and the object protection devices 452.

As shown in FIG. 6, the vehicle occupant protection devices 450 may include, for example, a front air bag 454, a side air bag 456, a rollover air bag 458, a rear air bag 460, a seat belt pretensioner device 462, an adjustable load limiter 464, a variable energy absorbing device 466 or any other suitable occupant protection device. Only the frontal air bag 454 is shown in FIGS. 4 and 5.

The object protection devices preferably include inflatable protection devices 452 located at various positions along the exterior surface of the vehicle 412. The object protection devices 452 illustrated in FIGS. 4, 5 and 6 include a front bumper air bag 468, a hood air bag 470, and a windshield air bag 472. Other object protection devices 452 may be located in other locations on the vehicle 412, for example, on the rear bumper. FIG. 4 illustrated the front bumper air bag 468, the hood air bag 470, and the windshield air bag 472 prior to actuation. FIG. 5 illustrates the front bumper air bag 468, the hood air bag 470, and the windshield air bag 472 subsequent to actuation and in an inflated condition.

Also mounted on the vehicle 412 is a warning device 474. The warning device 474 is operatively connected to the microcontroller 438 and is energizable for warning the vehicle occupant, particularly the vehicle operator, of a probable crash event. The warning device 474 emits at least one of an audio and a visual signal for warning the vehicle occupant.

Figures 8, 9:
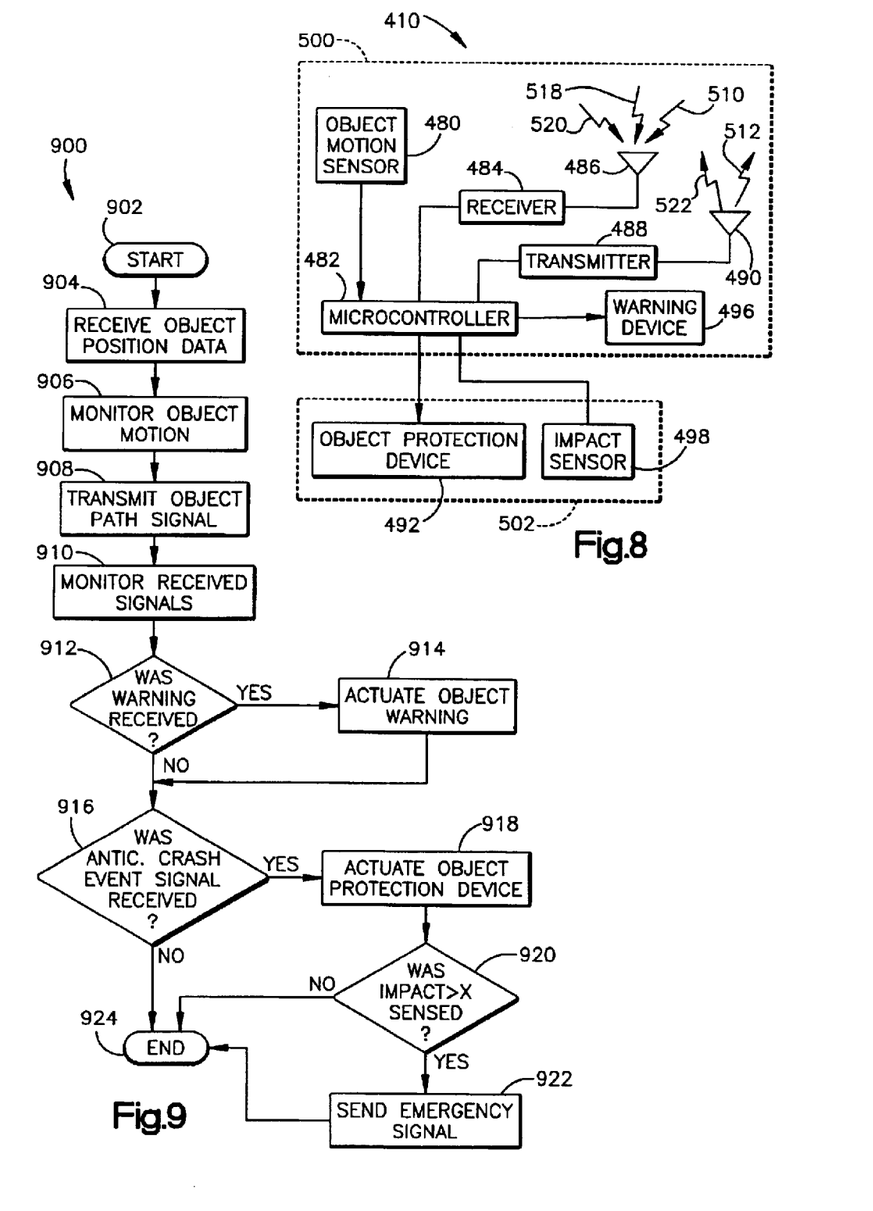
FIG. 8 is a schematic representation of an object mounted portion of FIG. 4.
FIG. 9 is a flow diagram illustrating a control process of an object mounted controller.

The object 414 illustrated in FIGS. 4 and 5 is a person, for example, a pedestrian. FIG. 8 illustrates structure of the anticipatory crash event system 410 that is mounted on the object 414. The object 414 includes an object motion sensor 480 that provides motion information to a microcontroller 482. Preferably, the motion information includes object speed information and object direction information.

The microcontroller 482 preferably includes a microprocessor. The microcontroller 482 may be in any form, such as, for example, one or more integrated circuits, a plurality of discrete components, or a combination of appropriately configured integrated circuits and discrete components.

A receiver 484 is mounted on the object 414. The receiver 484 is operatively connected to the microcontroller 482 and is also operatively connected to an antenna 486 for receiving signals that originate from a location remote from the object 414. Preferably, the received signals are radio frequency (RF) signals of a predetermined frequency. The receiver 484 includes suitable circuitry for filtering, amplifying, and demodulating the received signals. The receiver 484 provides the received signals to the microcontroller 482.

A transmitter 488 is also mounted on the object 414. The transmitter 488 is operatively connected to the microcontroller 438 and receives object condition information from the microcontroller 482. The object condition information indicates the position and speed of the object 414. The transmitter 488 contains circuitry to modulate the object condition information. An antenna 490 is operatively connected to the transmitter 488. The antenna 490 receives the modulated object condition information from the transmitter 488 and, in turn, broadcasts an object path signal 512 that includes the object condition information.

An object protection device 492 is also operatively connected to the microcontroller 482 of the object 414. The object protection device 492 preferably is an inflatable object protection device. The object protection device 492 illustrated in FIGS. 4 and 5 is an inflatable hip bag 494. The microcontroller 482 controls actuation of the object protection device 492. FIG. 4 illustrates the inflatable hip bag 494 in a non-inflated condition and FIG. 5 illustrated the inflatable hip bag 494 in an inflated condition.

A warning device 496 is also mounted on the object 414. The warning device 496 is operatively connected to the microcontroller 482 and is energizable for warning the object 414, i.e., the person, of a probable crash event. The warning device 496 emits at least one of an audio, a visual, and a tactile signal for warning the object 414.

An impact sensor 498 is also mounted on the object 414. The impact sensor 498 is operatively connected to the microcontroller 482. Preferably, the impact sensor 498 is attached to the object protection device 492. The impact sensor 498 is operable for sensing an impact to the object 414 and for providing an impact signal indicative of the impact severity to the microcontroller 482.

FIG. 4 illustrates the object mounted structure of the anticipatory crash event system 410 being held in two separate housings 500 and 502, respectively. The first housing 500 is in the form of a wrist watch that may be worn on the person's wrist. The dashed box indicated at 500 in FIG. 8 illustrates the first housing. The second housing 502 is in the form of a belt that may be worn about the person's waist. The dashed box indicated at 502 in FIG. 8 illustrates the second housing. The microcontroller 482 in the first housing 500 communicates with the object protection device 492 and the impact sensor 498 in the second housing 502 in a known manner, such as by wireless technology. Alternatively, all of the object mounted structure may be mounted in a single housing so that the microcontroller 482 may be hardwired to the object protection device 492 and the impact sensor 498.

During operation of the anticipatory crash event system 410, the antenna 486 and receiver 484 mounted on the object 414 periodically receive object position signals 510 that are broadcast from the central control station 416. Additionally, the object motion sensor 480 senses the speed, and preferably the direction of movement, of the object 414 and outputs object motion signals indicative of the sensed object motion. The object position signals 510 and object motion signals are provided to the microcontroller 482. The microcontroller 482 outputs object condition information to the transmitter 488. The object condition information preferably includes object position, speed and direction of movement information. The transmitter 488 modulates the object condition information and antenna 490 broadcasts an object path signal 512 that includes the object condition information. When the object 414 is stationary, the speed for the object is zero and thus, the object path signal 512 indicates the object having a constant position.

The vehicle mounted receiver 442, via antenna 444, receives a position signal 514 from the central control station 416 that is indicative of the position of the vehicle 412. The receiver 442 provides the position information to the microcontroller 438. The microcontroller 438 also receives vehicle speed information from the vehicle speed sensor 436. The microprocessor 438, in response to the vehicle position information and the vehicle speed information, determines a path of travel of the vehicle 412, i.e., the vehicle path. In determining the vehicle path, the microcontroller 438 may utilize a plurality of previous position data and the most recent position information. The position information may be stored in suitable memory associated with the microcontroller 438. The microcontroller 438 temporarily stores the determined vehicle path and also outputs vehicle path information to the transmitter 446. The transmitter 446, through antenna 448, broadcasts a vehicle path signal 516 indicative of the vehicle path.

The receiver 442, via antenna 444, also receives the object path signal 512 and provides the object condition information to the microcontroller 438. The microcontroller 438 calculates a path of travel of the object, i.e., the object path, based on the object condition information. Alternatively, the object condition information includes an object path that was calculated by microcontroller 482. The microcontroller 438 is configured to compare the vehicle path and the object path and to determine if the paths will intersect. The microcontroller 438 is also configured to anticipate a crash event. A crash event is anticipated when the microcontroller 482 determines that a crash event is either probable or imminent. The microcontroller 482 determines that a crash event is probable when, based upon a comparison of the vehicle path and the object path, the probability of a crash event between the vehicle 412 and the object 414 is greater than a first threshold value. Although a crash event is likely to occur when the first threshold value is exceeded, time remains for avoiding the crash event. The microcontroller 482 determines that a crash event is imminent when, based upon a comparison of the vehicle path and the object path, the probability of a crash event between the vehicle 412 and the object 414 is greater than a second threshold value. The second threshold value is a higher probability of a crash event than the first threshold value.

If the microcontroller 438 determines that a crash event is probable, the microcontroller 438 outputs two warning signals. One warning signal is provided to the warning device 474. In response to the warning signal, the warning device 474 provides an audio and/or visual warning to the vehicle occupant that a crash event is probable. Another warning signal is provided to the transmitter 446. The transmitter 446, via antenna 448, transmits the warning signal 518.

If the microcontroller 438 determines that a crash event is imminent, the microcontroller 438 outputs an anticipated crash event signal. The transmitter 446 receives the anticipated crash event signal and, via antenna 448, broadcasts the anticipated crash event signal 520. Additionally, in response to anticipating a crash event, the microcontroller 438 determines which, if any, of the vehicle occupant protection devices 450 and the object protection devices 452 should be actuated and actuates the appropriate protection devices.

The receiver 420 of the central control station 416 receives the object path signal 512 and the vehicle path signal 516 and provides the signals to the microcontroller 418. The microcontroller 418 is also configured to determine if the paths will intersect and to anticipate a crash event between the vehicle 412 and the object 414. A crash event is anticipated when the microcontroller 418 determines that a crash event is either probable or imminent. If the microcontroller 418 determines that the vehicle path and the object path will intersect and a crash event is probable, i.e., exceeds the first threshold value, the microcontroller 418 outputs a warning signal to the transmitter 428. The transmitter 428, via antenna 430, transmits a warning signal 518. If the microcontroller 418 determines that a crash event is imminent, i.e., exceeds the second threshold value, the microcontroller 418, via transmitter 428 and antenna 430, outputs an anticipated crash event signal 520. The warning signal 518 and the anticipated crash event signal 520 transmitted from the central control station 416 are redundant signals to those transmitted by the vehicle mounted portion of the anticipatory crash event system 410.

In response to receiving the warning signal 518, the object mounted receiver 484 provides the warning signal to the microcontroller 482. The microcontroller 482 outputs the warning signal to the warning device 496. In response to the warning signal, the warning device 496 provides an audio, visual, and/or tactile warning to the object, i.e., the person, that a crash event is probable.

In response to receiving an anticipated crash event signal 520, the object mounted receiver 484 provides the anticipated crash event signal to the microcontroller 482. The microcontroller 482, in response to receiving the anticipated crash event signal, outputs an actuation signal to actuate the object protection device 492.

Figure 7:
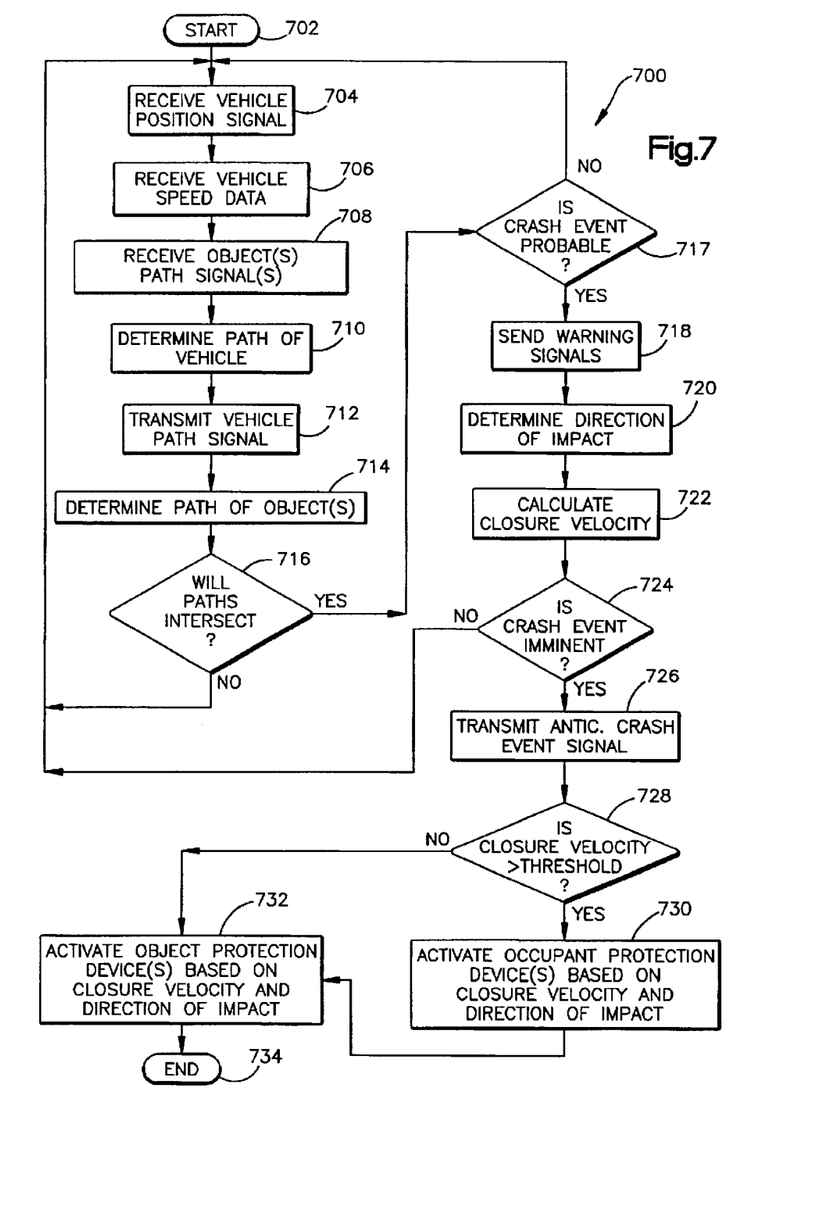
FIG. 7 is a flow diagram illustrating a control process of a vehicle mounted controller.

The flow diagram of FIG. 7 illustrates a control process 700 performed by the vehicle mounted microcontroller 438. The process 700 begins at step 702 in which the microcontroller 438 and other system components are initialized and internal memories, flags, initial conditions, etc., are set to initial values. At step 704, a vehicle position signal 514 is received. At step 706, vehicle speed information or data is received from the vehicle speed sensor.436. At step 708, one or more object path signals 512, each indicating object condition information, are received. The process 700 proceeds to step 710.

At step 710, the microcontroller 438 utilizes the vehicle position and speed information to determine the path of travel of the vehicle 412, i.e., vehicle path. The process 700 proceeds to step 712 in which the microcontroller 438 outputs vehicle path information to the transmitter 446 and antenna 448 broadcasts the vehicle path signal 516. At step 714, the microcontroller 438 uses the object condition information received in the object path signal 512 to determine the path of travel of the object 414, i.e., the object path. The process 700 then proceeds to step 716 in which a determination is made as to whether the vehicle path and the object path will intersect. If the determination at step 716 is negative, the process 700 returns to step 704. If the determination at step 716 is affirmative, the process proceeds to step 717. At step 717, a determination is made as to whether a crash event is probable, i.e., the probability of a crash event exceeds a first threshold value. If the determination at step 717 is negative, the process 700 returns to step 704. If the determination at step 717 is affirmative, the process 700 proceeds to step 718.

At step 718, the microcontroller 438 outputs warning signals. One warning signal is provided to the warning device 474. In response to the warning signal, the warning device 474 alerts the vehicle occupant of a probable crash event. A second warning signal 518 is provided to the transmitter 446 and is broadcast via antenna 448.

At step 720, the microcontroller 438 predicts a direction of impact between the vehicle 412 and the object 414. Step 720 includes anticipating a location on the exterior surface of the vehicle 412 where the object 414 will impact during the crash event. At step 722, the microcontroller 438 determines a closure velocity between the vehicle 412 and the object 414. The process 700 then proceeds to step 724.

At step 724, a determination is made as to whether a crash event is imminent, i.e., above the second threshold value. If the determination at step 724 is affirmative, the process 700 proceeds to step 726 and the microcontroller 438 outputs an anticipated crash event signal to the transmitter 446. In response to receiving the anticipated crash event signal, the transmitter 446, via antenna 448, transmits the anticipated crash event signal 520. If the determination at step 724 is negative, the process 700 returns to step 704.

The process 700 proceeds from step 726 to step 728. At step 728, a determination is made as to whether the determined closure velocity is greater than a predetermined threshold. An affirmative determination at step 728 indicates that activation or actuation of at least one of the vehicle occupant protection devices is desired for helping to protect the vehicle occupant. At step 730, at least one vehicle occupant protection device 450 is actuated. In determining which vehicle occupant protection device 450 to actuate, the microcontroller 438 considers the closure velocity between the vehicle 412 and the object 414 as well as the direction of impact. The process 700 then proceeds to step 732.

If the determination at step 728 is negative, the process 700 proceeds directly to step 732. At step 732, the microcontroller 438 actuates at least one object protection device 452. In determining which object occupant protection device 452 to actuate, the microcontroller 438 considers the closure velocity between the vehicle 412 and the object 414 as well as the direction of impact. The process 700 then proceeds to step 734 and the process ends.

FIG. 9 illustrates a control process 900 performed by the object mounted microcontroller 482. The process 900 begins at step 902 in which the microcontroller 482 and other system components are initialized and internal memories, flags, initial conditions, etc., are set to initial values. The process 900 proceeds to step 904 in which the object position signal 510 is received. At step 906, the microcontroller 482 receives the object motion information from the object motion sensor 480. The process 900 then proceeds to step 908.

At step 908, the microcontroller 482 outputs object condition information to the transmitter 488 and antenna 490 broadcasts the object path signal 512. At step 910, the microcontroller 482 monitors any signals received by antenna 486 and receiver 484. The process 900 then proceeds to step 912.

At step 912, a determination is made as to whether a warning signal 518 has been received. If the determination at step 912 is affirmative, the process 900 proceeds to step 914. At step 914, the microcontroller 482 outputs a warning signal to the warning device 496. The warning device 496, in response to the warning signal, alerts the object 414 of a probable crash event. The process 900 then proceeds to step 916.

If the determination at step 912 is negative, the process proceeds directly to step 916. At step 916, a determination is made as to whether an anticipated crash event signal 520 was received. If the anticipated crash event signal 520 was not received and the determination at step 916 is negative, the process 900 proceeds to step 924 and the process ends. If the determination in step 916 is affirmative, the process 900 proceeds to step 918 and the object protection device 492 is actuated.

Upon actuation of the object protection device 492, the process 900 proceeds to step 920 and the impact sensor 498 is monitored to determine whether the impact sensor 498 senses an impact of greater than a threshold value. If the determination in step 920 is affirmative, the process 900 proceeds to step 922 and the microcontroller 482 outputs emergency information to the transmitter 488. In response to the emergency information, the transmitter 488, via antenna 490, broadcasts an emergency signal 522 indicating the position of the object 414. The process 900 then proceeds to step 924 and the process ends.

If the determination at step 920 is negative and an impact of greater than the threshold value is not sensed, the process 900 proceeds from step 920 to step 924 and the process ends.

Figure 11:
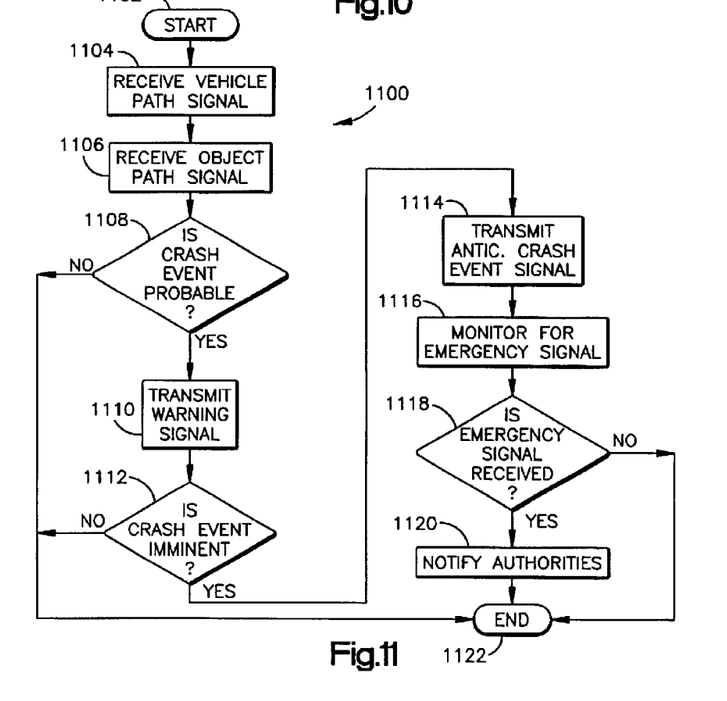
FIG. 11 is a flow diagram illustrating a control process of a central control station controller.

FIG. 11 illustrates a control process 1100 performed by the microcontroller 418 of the central control station 416. The process 1100 begins at step 1102 in which the microcontroller 418 and other system components are initialized and internal memories, flags, initial conditions, etc., are set to initial values. At step 1104, the vehicle path signal 516 is received. At step 1106, the object path signal 512 is received. The process 1100 then proceeds to step 1108.

At step 1108, a determination is made as to whether a crash event is probable, i.e., exceeds the first threshold value. If the determination at step 1108 is negative, the process 1100 proceeds to step 1122 and the process ends. If the determination at step 1108 is affirmative, the process 1100 proceeds to step 1110. At step 1110, the microcontroller 418 outputs warning information to the transmitter 428 and the transmitter, via antenna 430, broadcasts a warning signal 518. It is noted that this warning signal 518 is a redundant signal to that broadcast from the vehicle 412. The process 1100 then proceeds to step 1112.

At step 1112, the microcontroller 418 determines whether a crash event is imminent, i.e., exceeds the second threshold value. If the determination at step 1112 is negative, the process 1100 proceeds to step 1122 and the process ends. If the determination at step 1112 is affirmative, the process 1100 proceeds to step 1114. At step 1114, the microcontroller 418 outputs anticipated crash event information and the transmitter 428, via antenna 430, broadcasts the anticipated crash event signal 520. It is noted that this anticipated crash event signal 520 is a redundant signal to that broadcast from the vehicle 412. The process 1100 then proceeds to step 1116.

At step 1116, the microcontroller 418 monitors for receipt via antenna 422 and receiver 420 of an emergency signal 522. At step 1118, a determination is made as to whether an emergency signal 522 is received. If the determination at step 1118 is negative, the process 1100 proceeds to step 1122 and the process ends. If the determination at step 1118 is affirmative, the process 1100 proceeds to step 1120 and the microcontroller 418 via the emergency communication equipment 426 notifies emergency authorities of the crash event and the position of the object 414. The process 1100 ends at step 1122.

In view of the foregoing, it will be appreciated that the system 10 and 410 of the present invention anticipates a vehicle crash event and controls actuation of associated protection devices, preferably according to the relative paths of the vehicle and object involved in the crash event.

In addition to anticipating a crash event, the system 10 and 410 in accordance with the present invention also is operative for use in combination with conventional non-anticipatory crash sensors, such as the crash sensor 94 and 440. This is advantageous for situations when the adjacent object or objects involved in a crash event do not have an anticipatory crash event system or are otherwise unable to transmit condition signals for receipt by the system.

From the above description of the invention, those skilled in the art will perceive improvements, changes and modifications. For example, the object path signal 512 may include information that identifies the object, such as a first object code for a person and a second object code for a vehicle. Such improvements, changes and modifications within the skill of the art are intended to be covered by the appended claims.

Having described the invention, the following is claimed:

1. An apparatus for anticipating a crash event between a vehicle and an object, the apparatus comprising:
    a source of position information located remote from the vehicle and operable for providing a vehicle position signal indicating vehicle position;
    a vehicle speed sensor operable for sensing vehicle speed and for providing a vehicle speed signal indicating vehicle speed;
    a source of object condition information located the object and operable to originate an object path signal indicating position and speed of the object; and
    a controller mounted on the vehicle and operable, in response to receiving the vehicle position signal and the vehicle speed signal, for determining a vehicle path, the controller further being operable, in response to receiving the object path signal, for anticipating a crash event between the vehicle and the object.

2. The apparatus as set forth in claim 1 wherein the vehicle is a first vehicle and the object is a second vehicle.

3. The apparatus as set forth in claim 1 further including at least one vehicle occupant protection device which, when actuated, helps to protect a vehicle occupant during the crash event, said controller being operative to control actuation of said at least one vehicle occupant protection device in response anticipating the crash event.

4. The apparatus as set forth in claim 1 further including a transmitter mounted on the vehicle for broadcasting a vehicle path signal indicative of the vehicle path.

5. The apparatus as set forth in claim 1 wherein said controller is operative to determine a closure velocity between the vehicle and the object based upon the determined vehicle path and the received object path signal and for providing an anticipated crash event signal that varies as a function of the closure velocity.

6. The apparatus as set forth in claim 5 further including at least one vehicle occupant protection device that is actuatable in response to receiving the anticipated crash event signal for helping to protect a vehicle occupant during the crash event.

7. The apparatus as set forth in claim 1 wherein said controller is operative to determine a relative direction of anticipated impact between the vehicle and the object in response to the vehicle path and the object path signal and for providing an anticipated crash event signal that varies as a function of the relative direction of anticipated impact.

8. The apparatus as set forth in claim 7 further including at least one vehicle occupant protection device that is actuatable in response to receiving the anticipated crash event signal for helping to protect a vehicle occupant during the crash event.

9. The apparatus as set forth in claim 1 further including at least one inflatable object protection device mounted on the vehicle and actuatable to deploy outward from the vehicle for helping to protect the object during the crash event, said controller being operative to control actuation of said at least one inflatable object protection device in response anticipating the crash event.

10. The apparatus as set forth in claim 1 wherein the controller is configured to determine that a crash event is probable when a probability of a crash event occurring between the vehicle and the object exceeds a threshold and wherein a transmitter mounted on the vehicle broadcasts a warning signal in response to the controller determining that a crash event is probable.

11. The apparatus as set forth in claim 10 further including a receiver mounted on the object for receiving the warning signal, and an object warning device, responsive to receipt of the warning signal, for warning the object of a probable crash event.

12. The apparatus as set forth in claim 11 wherein the object warning device provides at least one of an audio, a visual, and a tactile signal for warning the object of the probable crash event.

13. The apparatus as set forth in claim 10 further including a vehicle occupant warning device that is actuatable in response to the controller determining that a crash event is probable for warning a vehicle occupant of the probable crash event.

14. The apparatus as set forth in claim 13 wherein the vehicle occupant warning device provides at least one of an audio and a visual signal for warning the vehicle occupant of the probable crash event.

15. The apparatus as set forth in claim 1 wherein the controller is configured to determine that a crash event is imminent when a probability of a crash event occurring between the vehicle and the object exceeds a threshold and wherein a transmitter mounted on the vehicle broadcasts an anticipated crash event signal in response to the controller determining that a crash event is imminent.

16. The apparatus as set forth in claim 15 further including at least one inflatable object protection device mounted on the object and actuatable, in response to receipt of the anticipated crash event signal, for helping to protect the object during the crash event.

17. The apparatus as set forth in claim 16 further including an impact sensor for sensing an impact of the crash event, and a transmitter mounted on the object for transmitting an emergency signal in response to the impact sensor sensing an impact of greater than a threshold value, the emergency signal including object position information.

18. The apparatus as set forth in claim 17 further including means for receiving the emergency signal and, in response to receiving the emergency signal, for contacting emergency authorities and for providing object position information to the emergency authorities.

19. The apparatus as set forth in claim 16 wherein said at least one inflatable protection device is mounted on a person and is actuatable for helping to protect the person.

20. The apparatus as set forth in claim 19 wherein the at least one inflatable protection device comprises an inflatable hip bag that is worn about a waist of the person.

21. The apparatus as set forth in claim 19 further including an impact sensor for sensing an impact of the crash event, and a transmitter mounted on the person for transmitting an emergency signal in response to the impact sensor sensing an impact of greater than a threshold value, the emergency signal including position information for the person.

22. The apparatus as set forth in claim 21 further including means for receiving the emergency signal and, in response to receiving the emergency signal, for contacting emergency authorities and for providing position information for the person to the emergency authorities.

23. A method for anticipating a crash event between a vehicle and an object, the method comprising the steps of:

receiving at the vehicle a vehicle position signal indicating vehicle position, the vehicle position signal originating at a source of position information located remote from the vehicle;

receiving at the vehicle a vehicle speed signal indicating vehicle speed;

determining, in response to the vehicle position signal and the vehicle speed signal, a vehicle path;

receiving at the vehicle an object path signal indicating position and speed of the object, the object path signal originating at the object; and anticipating, in response to the object path signal and determined vehicle path, a crash event between the vehicle and the object.

24. The method as set forth in claim 23 further including the step of:

actuating at least one vehicle occupant protection device in response anticipating the crash event.

25. The method as set forth in claim 23 further including the step of:

broadcasting a vehicle path signal indicative of the determined vehicle path.

26. The method as set forth in claim 23 wherein the step of anticipating a crash event further includes the steps of:

determining a closure velocity between the vehicle and the object based upon the determined vehicle path and the received object path signal; and providing an anticipated crash event signal that varies as a function of the closure velocity.

27. The method as set forth in claim 23 wherein the step of anticipating a crash event further includes the steps of:

determining a relative direction of anticipated impact between the vehicle and the object in response to the determined vehicle path and the object path signal; and providing an anticipated crash event signal that varies as a function of the relative direction of anticipated impact.

28. The method of claim 23 further including the step of:

actuating at least one inflatable object protection device in response anticipating the crash event.

29. The method as set forth in claim 23 wherein the step of anticipating a crash event further including the steps of:

determining a probability of the crash event in response to the received object path signal and determined vehicle path;

comparing the determined probability of the crash event to a first threshold value to determine if the crash event is probable; and broadcasting a warning signal in response determining that a crash event is probable.

30. The method of claim 29 further including the steps of:

receiving the warning signal at a warning device; and providing at least one of an audio, a visual, and a tactile signal in response receiving the warning signal at the warning device.

31. The method as set forth in claim 29 further including the steps of:

comparing the determined probability of the crash event to a second threshold value to determine if the crash event is imminent; and broadcasting an anticipated crash event signal in response determining that a crash event is imminent.

32. The method as set forth in claim 31 further including the steps of:

receiving the anticipated crash event signal; and actuating at least one vehicle occupant protection device in response to the received anticipated crash event signal.

33. The method as set forth in claim 31 further including the steps of:

receiving the anticipated crash event signal; and actuating at least one inflatable object protection device in response to the received anticipated crash event signal.

34. The method as set forth in claim 23 further including the steps of:

sensing an impact of the crash event between the vehicle and the object; and transmitting an emergency signal, including object position information, in response to the sensed impact exceeding a threshold value.

35. The method as set forth in claim 34 further including the steps of:

receiving the emergency signal;

contacting emergency authorities in response to receiving the emergency signal; and providing object position information to the emergency authorities.

* * * * *

UNITED STATES PATENT AND TRADEMARK OFFICE
CERTIFICATE OF CORRECTION

PATENT NO. : 6,851,504 B2
DATED : February 8, 2005
INVENTOR(S) : Douglas P. Campbell and Gregory S. Bayley It is certified that error appears in the above-identified patent and that said Letters Patent is hereby corrected as shown below:

Column 15,
Line 63, after "located" insert -- on --.

Signed and Sealed this

Seventh Day of June, 2005

JON W. DUDAS
*Director of the United States Patent and Trademark Office*